United States Patent
Humburg et al.

[11] Patent Number: 6,106,282
[45] Date of Patent: Aug. 22, 2000

[54] FUEL-OPERATED HEATER

[75] Inventors: Michael Humburg, Göppingen; Harald Sailer, Esslingen; Andreas Alber, Stuttgart, all of Germany

[73] Assignee: J. Eberspächer GmbH, Esslingen, Germany

[21] Appl. No.: 09/138,499

[22] Filed: Aug. 24, 1998

Related U.S. Application Data

[63] Continuation of application No. 08/769,108, Dec. 18, 1996, abandoned.

[30] Foreign Application Priority Data

Dec. 22, 1995 [DE] Germany ............................ 195 48 225

[51] Int. Cl.[7] .................................................... F24H 1/00
[52] U.S. Cl. .................................... 432/222; 123/142.5 R; 237/12.3 C
[58] Field of Search ................................... 432/222, 223; 237/12.3 C; 431/12, 75, 89, 90, 18, 19; 123/550, 142.5 R

[56] References Cited

U.S. PATENT DOCUMENTS

| | | |
|---|---|---|
| 4,613,072 | 9/1986 | Kikuchi et al. .................. 237/12.3 C |
| 5,401,162 | 3/1995 | Bonne ...................................... 431/12 |

*Primary Examiner*—Denise L. Ferensic
*Assistant Examiner*—Jiping Lu
*Attorney, Agent, or Firm*—McGlew and Tuttle, P.C.

[57] ABSTRACT

A fuel-operated heater, especially an auxiliary heater for a motor vehicle, with a fuel feed pump and/or with a combustion air fan, the heater, being operated in a predetermined lambda range. The heater is associated with a pressure sensor, by which the controllable fuel feed pump and/or the controllable combustion air fan can be energized via a control device. The pressure sensor may be arranged externally or also in the heater, especially on the pressure side of the fan. Not only changes in air pressure caused by atmospheric conditions, but also system-dependent changes in air pressure can be corrected in the case of the arrangement of a sensor on the pressure side of the fan.

17 Claims, 1 Drawing Sheet

FUEL-OPERATED HEATER

This is a continuation of application serial No. 08/769,108 filed Dec. 18, 1996, now abandoned, and the entire disclosure of this prior application is considered to be part of the disclosure of the accompanying application and is hereby incorporated by reference therein.

FIELD OF THE INVENTION

The present invention pertains to a fuel-operated heater, especially an auxiliary heater for a motor vehicle, with a fuel feed pump and/or a combustion air fan.

BACKGROUND OF THE INVENTION

In a prior-art fuel-operated heater, the combustion of fuel, mostly gasoline or diesel fuel, takes place in the combustion chamber under air excess. This means that the waste gas still contains oxygen, and stoichiometrically complete combustion does not take place. The range of operation of the combustion chamber, in terms of combustion engineering, covers a lambda range (possible air-to-fuel ratios within the range of operation). To ensure the operation of the device in this range, the amount of combustion air is set during the installation of a prior-art heater or of the fan by a variable bypass opening, or the amount of fuel through the fuel feed pump is set by means of an adjusting screw. This requires a high design effort for the heater and long adjustment times.

The above-mentioned range of operation may be left during the operation of a heater for the following reasons:

Clogging of the combustion air intake or of the waste gas outlet, as a result of which the amount of combustion air is reduced, clogging of a heat exchanger connected to the heater by combustion residues, as a result of which the amount of combustion air is also reduced during the operation, change in the combustion air mass flow during the operation of the heater at different altitudes above mean sea level.

If the operating or lambda range is left, the combustion values deteriorate. The heater no longer operates satisfactorily and it may fail.

SUMMARY AND OBJECTS OF THE INVENTION

The primary object of the present invention is to provide a fuel-operated heater of the type mentioned in the introduction, which has a simple design, yet can be operated effectively and reliably with good combustion values in an environmentally friendly manner in many operating situations.

According to the invention, a fuel-operated heater is provided, especially an auxiliary heater for a motor vehicle, with an adjustable or controllable fuel feed pump and/or with an adjustable or controllable combustion air fan. The heater is operated in a predetermined lambda range and is associated with a pressure sensor, by which the controllable fuel feed pump and/or the controllable combustion air fan can be energized via a control device or means.

The heater preferably has a pressure sensor arranged in the heater on the high pressure side of the fan. A zero or initial setting of the heater (ambient air pressure (po amb), sensor pressure (po sens), system back pressure (po syst)) is preferably performed with the pressure sensor, i.e., the amount of fuel is adjusted to the actual amount of combustion air with which the heater can be operated in the predetermined lambda range. The zero or initial setting may be performed together with the testing of the heater. When the current sensor pressure (p sens) changes compared with the sensor pressure (po sens) measured at the zero or initial setting, the feed pump frequency (f) and/or the fan speed (n) are preferably adjusted.

During the testing of the heater, settings for the fan and fuel pump or means are determined in order to have the heater operate in a desired lambda range. The ambient air pressure at the time of testing is recorded as the initial ambient pressure. During actual operation, the actual ambient pressure is measured. The difference between the initial ambient pressure and the actual ambient pressure is determined and is used to adjust or amend the settings for the fan and fuel means. The heater is then operated using the adjusted or amend settings.

During a test operating, the testing operating pressure (po sens) on the high pressure side of the fan means is also recorded. Then during actual operation, the actual operating pressure (p sens) is measured. The difference between the test operating pressure and the actual operating pressure is determined, and is also used to adjust or amend the settings for the fan and fuel means. The heater is then operated using these adjusted or amend settings.

It is further possible to determined system back pressure, both at the initial testing and during actual operation. The difference between the initial back pressure and the actual back pressure is determined and is also used to adjust or amend the initial settings for the fan and fuel means. The heater is then operated using these adjusted or amend settings.

To represent a current ambient pressure (p amb) or current system back pressure (p syst), the current sensor, or operating pressure (p sens) is preferably evaluated during the shutoff of the fan or before the operation of the fan and during the operation of the fan, distinguishing the following cases:

1. Heater Operation with Fan Shut Off
    1.1. p sens<po sens=po amb>>>p amb<po amb
    1.2. p sens>po sens=po amb>>>p amb>po amb
2. Heater Operation with Fan in Operation
    2.1. p sens<po sens=po amb>>>p amb<po amb
    2.2. p sens>po sens=po amb>>>p syst>po syst
    2.3. p sens>po sens=po amb>>>p amb>po amb, and the feed pump frequency (f) is automatically reduced and/or the fan speed (n) is automatically increased in both
        case 1.1 in conjunction with 2.1, and in
        case 1.2 in conjunction with 2.2.

In one embodiment, the pressure sensor is preferably arranged externally in the area of the heater. The pressure sensor may be a piezoresistive pressure sensor.

The control device is preferably operated according to a characteristic (K) in which the barometric altitude formula is taken into account, wherein a relationship between the geodetic altitude (h) and the feed pump frequency (f) and/or the fan speed (n) is established, and the amount of fuel and/or the amount of combustion air are automatically adjusted corresponding to the current geodetic altitude by reducing the frequency of the fuel feed pump and/or by increasing the speed of the combustion air fan.

The essence of the present invention is to associate a heater operated with fuel in a predetermined lambda range (e.g., an auxiliary heater for a motor vehicle, an engine-independent parking heater of a motor vehicle, but also a burner for soot filter units, boilers or the like) with a pressure sensor, by which the controllable fuel feed pump and/or the controllable combustion air fan can be energized via a control device.

Due to the present invention, it is possible to use especially the ambient air pressure of a heater as an actuating variable in an electronic control device in order to adjust the feed pump and/or the fan of the heater such that the predetermined lambda range of the combustion is not left and is especially maintained in a set range, and optionally it is even maintained at a constant value. It is thus possible to operate the device in a satisfactorily functioning manner at different altitudes above sea level. The ambient air pressure has been known to decrease with increasing altitude (by about 100 mbar per 1,000 m relative to the sea level). The density and consequently also the oxygen content per unit volume of air thus decrease as well. If the amount of fuel is maintained at a constant value, the combustion changes toward "rich combustion"—the air-to-fuel ratio, i.e., the lambda value, becomes low. To prevent this from happening, the air and/or the fuel are adjusted.

A "zero setting" can be performed with the pressure sensor especially during a testing of the heater (warm or cold), i.e., the amount of fuel is adjusted to the actual amount of air. The device can be operated in the lambda range without problems with the zero setting. Should changes of a certain magnitude from the pressure at the "zero setting" be registered, the control begins to operate (especially a reduction in the frequency of the feed pump or an increase in the speed of the fan).

If the values of each sensor are specifically determined during the testing of the heater for a plurality of heaters, this has a favorable effect concerning the requirement on accuracy. Such devices can be manufactured with comparatively wide tolerances at minimal cost. In an especially preferred variant, the pressure sensor can be arranged in the heater on the pressure side of the fan. The pressure sensor can thus be evaluated before and during the operation of the fan, and it is possible to decide whether a registered increase in pressure took place because of an increased ambient pressure or possibly because of an increased system back pressure, which has increased, e.g., due to clogging of the waste gas outlet or due to clogging of a heat exchanger connected to the heater by combustion residues.

The amount of air mass delivered by a combustion air fan has been known to also depend on the system back pressure ($\Sigma$ combustion air routing–heater–waste gas routing), which may have to be dealt with by adjusting the fan. In addition, the delivery behavior of a fan is subject to variations (depending, among other things, on the speed and the fan gap), so that the delivery of combustion air varies from one heater to the next even without differences in the air or waste gas routing, and it makes it necessary to set the combustion air.

The suitable pressure sensors are especially piezoresistive pressure sensors, which determine the absolute pressure or also the relative pressure (relative to the environment).

Instead of the fuel feed pump, the heater may also have a timing valve. It is evident that the timing valve may be optionally energized in this case. The variant with timing valve is within the claimed scope of protection of the present invention.

An especially expedient embodiment of the present invention provides for arranging the pressure sensor externally in the area of the heater rather than in the heater. If the control device is now operated according to a characteristic in which the barometric altitude formula is taken into account, the amount of fuel can be automatically adjusted (reduced) corresponding to the current geodetic altitude based on the relationship between the feed pump frequency and the geodetic altitude.

The speed of a combustion air fan can also be adjusted (increased) analogously.

The following advantages are achieved by the present invention:

1. The complicated adjustment process during the manufacture of the heater is avoided.
2. A bypass is eliminated.
3. The heater operates reliably during its service life even with increasing contamination of the heat exchanger.
4. The range of operation (lambda range) of the combustion chamber may be narrow (low development cost), unlike in prior-art designs.
5. Unlike in prior-art designs, the setting of the fuel feed pump may be inaccurate (simple manufacture).

The present invention will be described in greater detail below on the basis of exemplary embodiments with reference to the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 1 is a schematic axial section of a fuel-operated heater with combustion chamber, heat exchanger, combustion air fan, and fuel feed pump according to the invention; and FIG. 2 is a special control variant in which the barometric altitude formula is utilized.

DESCRIPTION OF THE PREFERRED EMBODIMENTS

Figure 1:
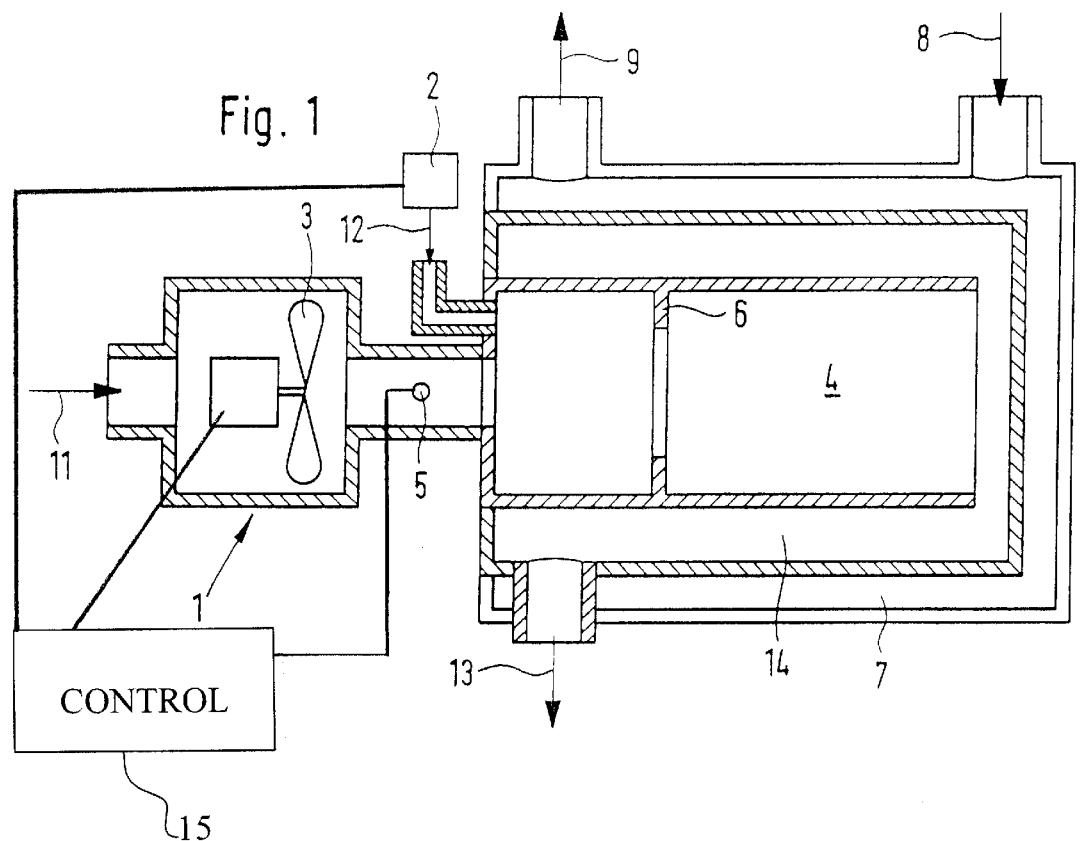

Referring to the drawings in particular, FIG. 1 shows a fuel-operated heater comprising a fuel feed pump 2 and a combustion air fan 3. The heater 1 has a combustion chamber 4 with an inner flame diaphragm 6, a waste gas ring 14, and an outer heat exchanger 7 in the form of a water jacket with a cold water feed 8 and a warm water return line 9.

The combustion air 11 is fed axially to the combustion air fan 3, and it is removed axially on the pressure side of the fan, from which it reaches the combustion chamber 4 and is mixed with the fuel 12 fed in by the fuel feed pump 2 there. The air-fuel mixture, which is within a lambda range that is favorable in terms of combustion engineering, is burned in the combustion chamber 4, and the waste gas 13 is discharged laterally to the outside via the waste gas ring 14. All this substantially corresponds to the state of the art.

Provisions are now made according to the present invention to associate the heater 1, operated in a predetermined lambda range, with a pressure sensor 5, which is located on the pressure side of the fan in the exemplary embodiment according to FIG. 1.

The sensor 5 in the exemplary embodiment according to FIG. 1 is a piezoresistive pressure sensor, which is able to determine either the absolute pressure or the relative pressure relative to the environment.

The controllable fuel feed pump 2 and/or the controllable combustion air fan 3 can be energized by the pressure sensor via an electronic control device or means 15. In particular, the pressure sensor determines a current pressure value, which can be assigned to the current lambda value. A controller compares this lambda value with the desired value (command variable) and controls the combustion air fan 3 and/or the fuel feed pump 2 according to a specified control relationship law. If the lambda value determined deviates from the desired value, a correction is performed.

During the testing of the heater (warm or cold), the pressure sensor 5 is set to a "zero position", or the initial settings are recorded, at which the heater 1 can be operated without problems over a certain lambda range. The zero or initial setting provides for an adjustment or setting of the amount of fuel to the current amount of air of a given heater for an initial ambient pressure, i.e., at sea level or at mean sea level. If during the subsequent operation of the heater 1 changes of a certain magnitude occur in the measured pressure of the pressure sensor 5 compared with the to zero or initial setting, the feed pump frequency and/or the fan speed can be adjusted (the relative settings of the fan means 3 and fuel pump or means 2 are changed).

Both the instantaneous ambient air pressure and the instantaneous system back pressure can be registered with the pressure sensor 5 arranged on the pressure side of the fan. Thus, not only the atmospheric changes in pressure acting on the heater 1, but also the disturbances in the system pressure of the heater can be corrected according to the present invention due to a pressure sensor being arranged on the pressure side of the fan. It is necessary for this to evaluate the pressure sensor 5 before and during the operation of the fan, as it is described in the table below.

TABLE

| | |
|---|---|
| 1. | Distinction of cases/fan shut off |
| 1.1. | If p amb < po amb >>> p sens < po sens = po amb |
| 1.2. | If p amb > po amb >>> p sens > po sens = po amb |
| 2. | Distinction of cases/fan in operation |
| 2.1. | If p amb < po amb >>> p sens <po sens >>> f↘ n↗ |
| 2.2. | If p syst > po syst >>> p sens > po sens >>> f↘ n↗ |
| 2.3. | If p amb > po amb >>> p sens > po sens |
| po amb: | ambient pressure at "zero setting" |
| po sens: | sensor pressure at "zero setting" |
| p amb: | current ambient air pressure |
| p sens: | current sensor pressure |
| p syst: | current system back pressure |
| po syst: | system back pressure at "zero setting" |
| f: | feed pump frequency |
| n: | speed/combustion air fan |

Another variant of the arrangement of a pressure sensor 5 is characterized in that it is located externally in the area of the heater 1.

The current ambient air pressure can be measured by means of a simple, external pressure sensor acting as an absolute pressure pickup, e.g., a barometric cell, and $$h = 18.4 \text{ km} \times \log pn/ph$$

can be calculated by means of the barometric altitude formula, in which

| | |
|---|---|
| h: | current altitude above mean sea level |
| pn: | pressure at mean sea level |
| ph: | current pressure at current altitude. |

The amount of fuel 12 can be automatically adjusted (reduced) corresponding to the current geodetic altitude h by changing the frequency on the basis of a characteristic K stored in the control device, which describes the relationship between the feed pump frequency f and the geodetic altitude h.

Figure 2:
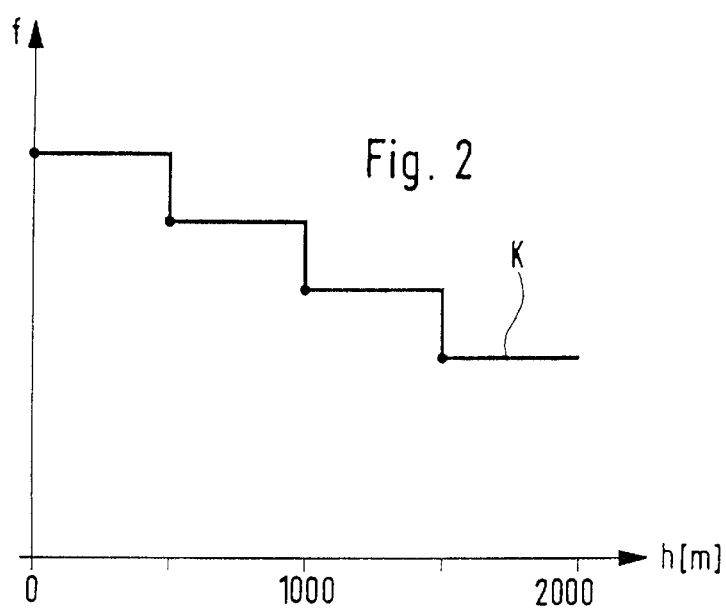

A possible relationship between the feed pump frequency f and the geodetic altitude h is schematically shown in FIG. 2. The step function illustrated in FIG. 2 may be reduced or enlarged as desired.

While a specific embodiment of the invention has been shown and described in detail to illustrate the application of the principles of the invention, it will be understood that the invention may be embodied otherwise without departing from such principles.

What is claimed is:

1. A process for operating a combustion heater, the process comprising the steps of:

providing a combustion chamber;

providing a fan means for delivering combustion air to said combustion chamber;

providing a fuel means for delivering fuel to said combustion chamber;

setting said fan means and said fuel means to operate the heater in a desired lambda range at an initial ambient pressure;

measuring actual ambient pressure;

determining an ambient difference between said actual ambient pressure and said initial ambient pressure;

adjusting said fuel means to an amended setting based on said ambient difference to operate the heater in said desired lambda range;

operating said fan means, and said fuel means with said amended setting, to cause combustion in said combustion chamber.

2. A process in accordance with claim 1, wherein:

said measuring of said actual ambient pressure is performed by providing a pressure sensor on a high pressure side of said fan means, and reading said pressure sensor when said fan means is not operating.

3. A process in accordance with claim 2, wherein:

said pressure sensor senses actual operating pressure and actual system back pressure;

said setting is based on said initial ambient pressure (po amb), an initial operating pressure (po sens) and an initial system back pressure (po syst);

said control means adjusts at least one of a frequency (f) of a fuel pump of said fuel means and a fan speed (n) of said fan means when an actual operating pressure (p sens) changes compared with said initial operating pressure (po sens) determined at said setting.

4. A process in accordance with claim 3, wherein:

to provide one of said actual ambient pressure (p amb) and said actual system back pressure (p syst), said actual operating pressure (p sens) is evaluated during one of a shutoff of said fan means and before operation of said fan means and during the operation of said fan means wherein when the heater is operated with said fan means shut off:

when p sens is less than po sens which is equal to po amb this implies that p amb is less than po amb;

when p sens is greater than po sens which is equal to po amb this implies that p amb is greater than po amb; and wherein when said heater is operated with said fan means in operation:

when p sens is less than po sens which is equal to po amb this implies that p amb is less than po amb;

when p sens is greater than po sens which is equal to po amb this implies that p syst is greater than po syst, or that p amb is greater than po amb, and said feed pump frequency (f) is automatically reduced and/or said fan speed (n) is automatically increased when both p sens is less than po sens when said heater is operated with said fan shut off and p sens is less than po sens when said heater is operated with said fan means in operation and said feed pump frequency (f) is automatically increased and/or said fan speed (n) is automatically reduced when both p sens is greater than po sens when said heater is operated with said fan means shut off and p sens is greater than po sens when said heater is operated with fan means in operation.

5. The process in accordance with claim 2, wherein;
said pressure sensor is a piezoresistive pressure sensor, and adjusting only adjusts said fuel means.

6. A process in accordance with claim 1, further comprising:
determining an initial operating pressure on a high pressure side of said fan means during said determining of said desired lambda range;
measuring actual operating pressure of said high pressure side said fan means;
determining an operating difference between said actual operating pressure and said initial operating pressure;
adjusting said fuel means to said amended setting based on said ambient difference and said operating difference.

7. A process in accordance with claim 6, wherein:
a pressure sensor is provided on said high pressure side of said fan means,
said measuring of said actual ambient pressure is performed by reading said pressure sensor when said fan means is not operating,
said measuring of said actual operating pressure is performed by reading said pressure sensor when said fan means is operating.

8. A process in accordance with claim 1, further comprising:
determining an initial back pressure of said fan means during said determining of said desired lambda range;
determining actual back pressure of said fan means;
determining a back difference between said actual back pressure and said initial back pressure;
adjusting said fuel means to said amended setting based on said ambient difference and said back difference, said amended setting being reducing a delivery rate of said fuel means if said actual back pressure is larger than said initial back pressure.

9. A process in accordance with claim 1, wherein:
said pressure sensor is arranged externally in an area of the heater wherein said fan means and said fuel means is operated according to a characteristic (K) in which a barometric altitude formula is taken into account based on a relationship between a geodetic altitude (h) and at least one of a feed pump frequency (f) and a fan speed (n);
automatically adjusting one of an amount of fuel and an amount of combustion air corresponding to a current geodetic altitude by one of reducing said frequency of said fuel feed pump and by increasing said fan speed.

10. A process for operating a fuel-operated heater, the process comprising the steps of:
providing a combustion chamber;
providing an adjustable fuel feed pump connected to said combustion chamber;
providing an adjustable combustion air fan connected to said combustion chamber;
providing a pressure sensor arranged in said heater on a high pressure side of said fan for sensing ambient air pressure, sensor pressure and system back pressure;
providing a control operating the heater according to a defined control having a defined control setting with relative settings of said air fan and said fuel feed pump based on an initial value of said ambient air pressure (po amb), an initial value of said sensor pressure (po sens) and an initial value of said system back pressure (po syst);
operating said heater for a period with said fan shut off;
operating said fan for a period with the fan in operation;
changing said defined control from said control setting to a modified control setting with said feed pump frequency (f) reduced when both p sens is less than po sens when said heater is operated with said fan shut off and p sens is less than po sens when said heater is operated with the fan in operation; and
changing said defined control from said control setting to a modified control setting with said feed pump frequency (f) increased when both p sens is greater than po sens when said heater is operated with said fan shut off and p sens is greater than po sens when said heater is operated with the fan in operation.

11. A combustion heater comprising:
a combustion chamber;
a fan means for feeding combustion air to said combustion chamber;
a fuel means for delivering fuel to said combustion chamber;
a pressure sensor means for measuring actual ambient pressure;
control means for storing a setting of said fan means and said fuel means to operate the heater in a desired lambda range at an initial ambient pressure, said control means adjusting said setting of said fuel means based on a comparison of said initial ambient pressure and said actual ambient pressure.

12. A heater in accordance with claim 11, wherein:
said pressure sensor means is arranged on a high pressure side of said fan means.

13. A heater in accordance with claim 12, wherein;
said settings are based on initial said ambient pressure (po amb), operating pressure (po sens), system back pressure (po syst), said settings being changed by said control means based on a pressure sensed by said pressure sensor means and wherein an amount of fuel is adjusted to the actual amount of combustion air with which the heater can be operated in the predetermined lambda range.

14. A heater in accordance with claim 13, wherein:
said settings are determined together with a testing of the heater.

15. A heater in accordance with claim 13, wherein;
said pressure sensor means also measures actual operating pressure (p sens);
said control means adjusts one of a frequency (f) of said fuel means and a fan speed (n) of said fan means when said actual operating pressure (p sens) changes compared with said initial operating pressure (po sens).

16. A heater in accordance with claim 15, wherein:

to provide at least one of said actual ambient pressure (p amb) and actual system back pressure (p syst), said actual operating pressure (p sens) is evaluated by said control means during one of a shutoff of said fan means and before operation of said fan means and during the operation of the fan, wherein when the heater is operated with the fan shut off:

when p sens is less than po sens which is equal to po amb this implies that p amb is less than po amb;

when p sens is greater than po sens which is equal to po amb this implies that p amb is greater than po amb; and wherein when said heater is operated with the fan in operation:

when p sens is less than po sens which is equal to po amb this implies that p amb is less than po amb;

when p sens is greater than po sens which is equal to po amb this implies that p syst is greater than po syst, or that p amb is greater than po amb, and the feed pump frequency (f) is automatically reduced and/or the fan speed (n) is automatically increased by said control means when both p sens is less than po sens when said heater is operated with said fan shut off and p sens is less than po sens when said heater is operated with said fan means in operation and said fuel means frequency (f) is automatically increased and/or the fan speed (n) is automatically reduced by said control means when both p sens is greater than po sens with said fan shut off and p sens is greater than po sens when said heater is operated with the fan in operation.

17. A heater in accordance with claim 11, wherein:

said pressure sensor means is arranged externally in an area of the heater;

said control means is operated according to a characteristic (K) in which a barometric altitude formula is taken into account based on a relationship between the geodetic altitude (h) and at least one of a feed pump frequency (f) of said fuel means and a fan speed (n) of said fan means, said control means automatically adjusting one of an amount of fuel and an amount of combustion air corresponding to a current geodetic altitude by one of reducing said frequency of said fuel means and by increasing said speed of the said combustion air fan.

* * * * *